3,529,408
CONTINUOUSLY UNLOADING COMBINE
Robert A. Stark, Columbus, and Floyd E. Keller, Circleville, Ohio, assignors to FMC Corporation, San Jose, Calif., a corporation of Delaware
Filed June 3, 1968, Ser. No. 734,092
Int. Cl. A01d 41/02
U.S. Cl. 56—21                                                10 Claims

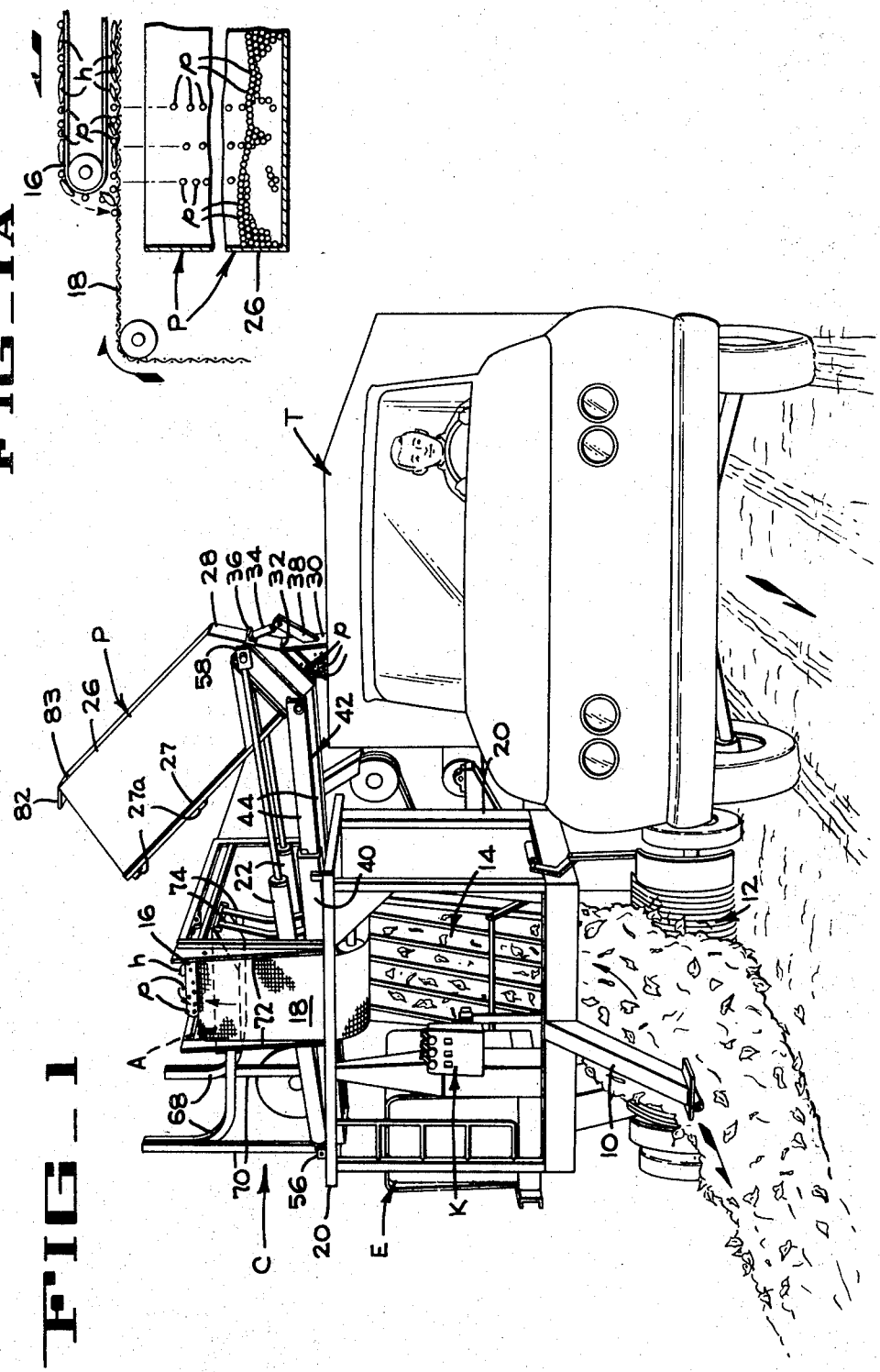

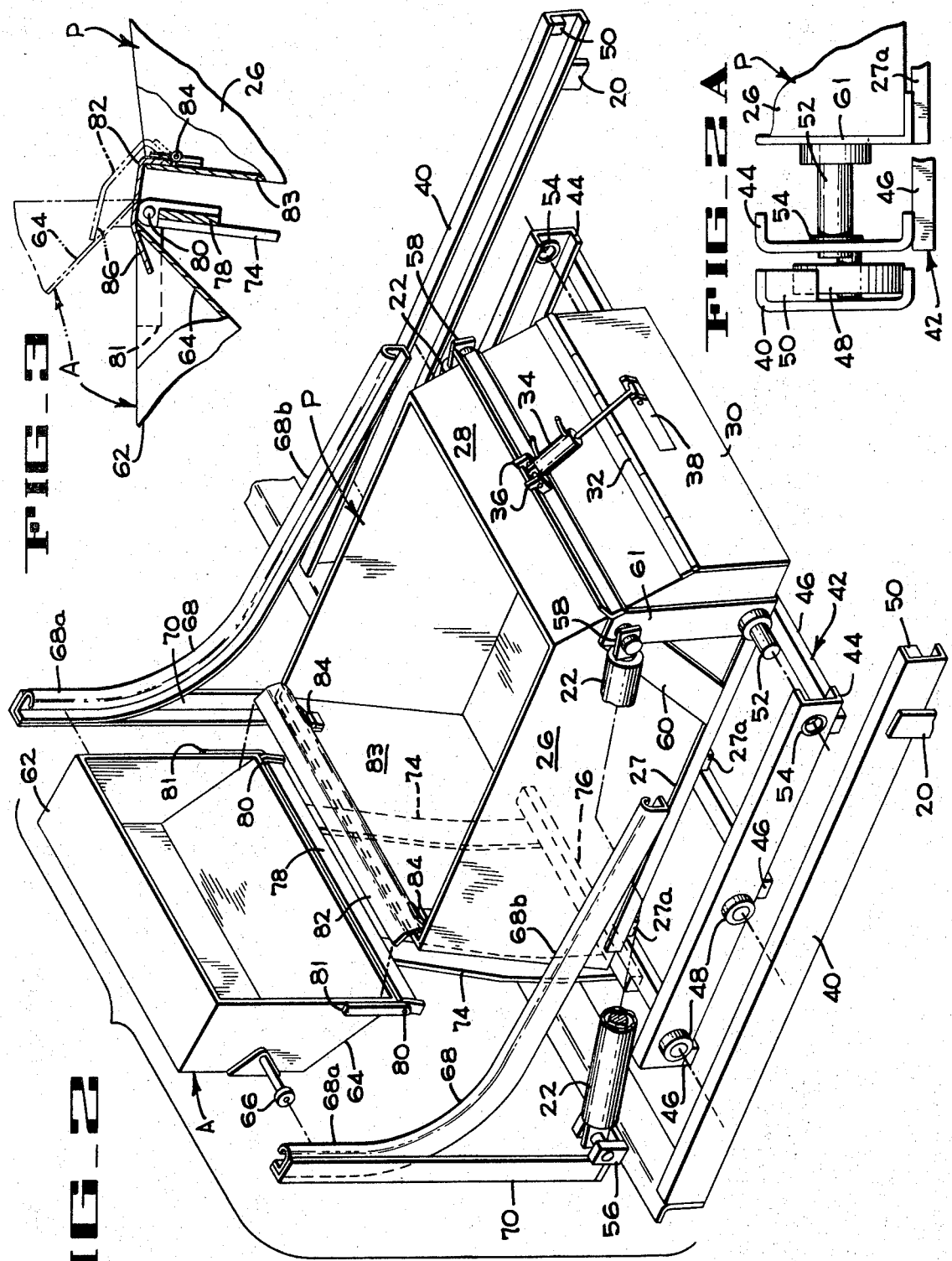

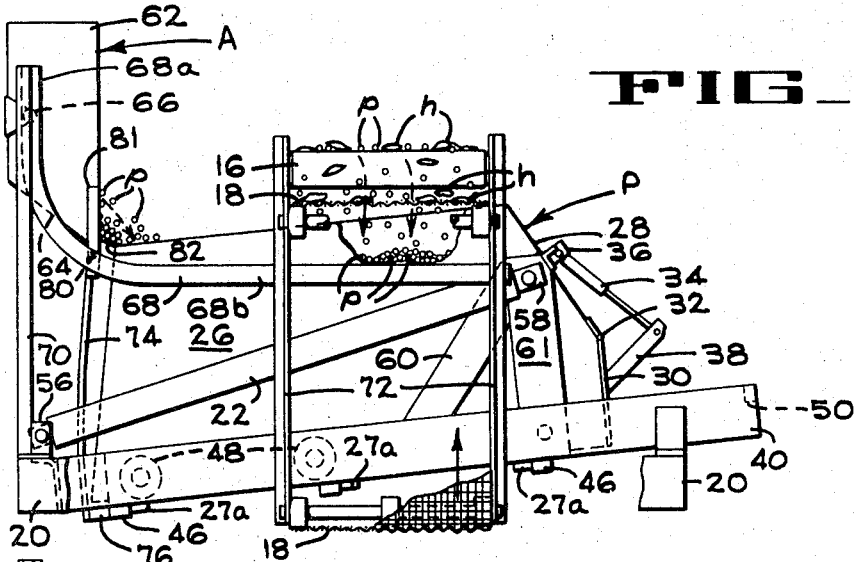
FIG_4
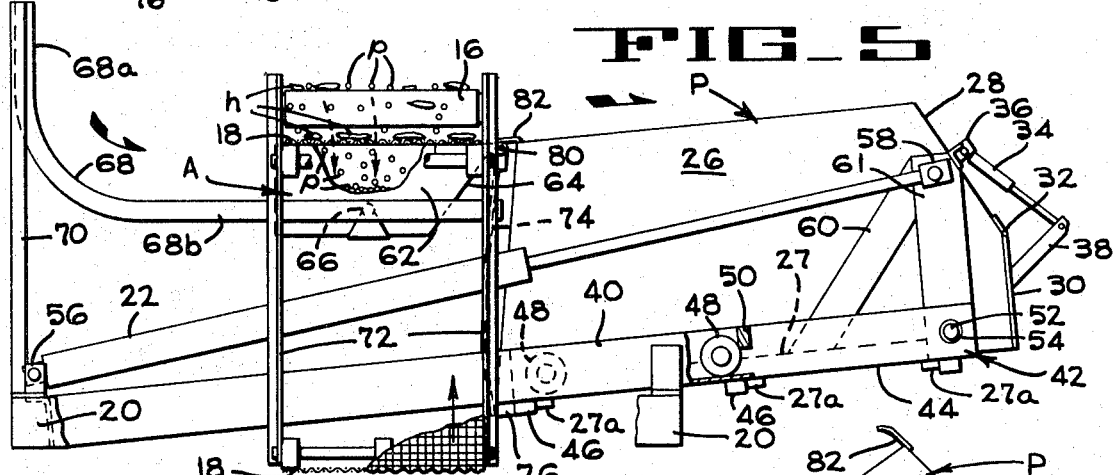
FIG_5
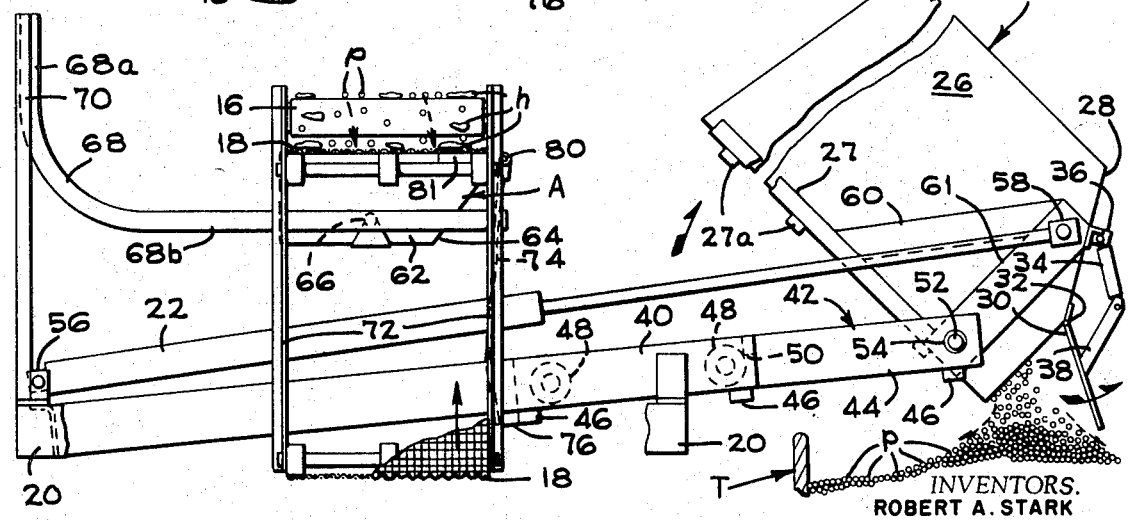
FIG_6
INVENTORS.
ROBERT A. STARK
FLOYD E. KELLER
BY J.W. Anderson
C. C. Tripp
ATTORNEYS United States Patent Office 3,529,408
Patented Sept. 22, 1970

ABSTRACT OF THE DISCLOSURE

A combine has a primary hopper movable to the side for discharge into a moving vehicle, and an auxiliary hopper is connected to move temporarily under the product conveyor during side discharge. Upon return to the primary hopper to its receiving position, the auxiliary hopper dumps its temporarily accumulated product into the primary conveyor.

FIELD OF THE INVENTION

This invention relates to harvesting and more particularly to combined harvesters and threshers (combines) which unload the harvest product in the field.

DESCRIPTION OF THE PRIOR ART

The embodiment of the invention disclosed is a combine for green peas, lima beans, etc. in which the product is separated from the vines and from its pods and delivered by a conveyor to a hopper while the machine is traversing the field. When the hopper is filled with product, prior machines of this type were emptied in the field by stopping the combine and dumping the hopper into a truck or trailer pulled up alongside of the combine. A harvester of this type is disclosed in Hamachek et al. 3,326,035. Some models of the Green Pea Combine manufactured by the assignee of the present invention, the FMC Corporation, also required that the combine be stopped for dumping of the peas, beans or product into a waiting truck.

SUMMARY OF THE INVENTION

The continuously unloading combine of the present invention makes it unnecessary to iterrupt movemet of the combine down the crop row in order to unload the peas, beans or other harvest product into a truck. In the present invention, the truck moves along with the combine during unloading, and an accumulated load of product is dumped into the truck while both the combine and the truck are moving, and without loss of product.

This is accomplished by providing two hoppers, a primary and an auxiliary hopper. The primary hopper, as before, is movable from a product receiving position to a product discharge position wherein the primary hopper dumps into a truck. However, in the present invention an auxiliary hopper is connected to move temporarily under the product delivery conveyor during discharge of the primary hopper into the truck. Furthermore, when the primary hopper is returned empty to its product receiving position, the auxiliary hopper is moved into its discharge position, whereupon the product temporarily accumulated in the auxiliary hopper during dumping of the primary hopper, is transferred to the primary hopper. Thus under this invention, continuous threshing without interrution for unloading is made possible, and without loss of product.

BRIEF DESCRIPTION OF THE DRAWINGS

FIG. 1 is a perspective of a combine embodying the present invention.

FIG. 1A is a diagrammatic detail of the product delivery system.

FIG. 2 is an exploded diagrammatic view of the hopper system of the invention.

FIG. 2A is an enlarged fragmentary section showing the carriage mounting of the primary hopper.

FIG. 3 is an enlarged fragmentary section showing the apron connection between the primary and auxiliary hoppers.

FIG. 4 is an operational view showing the auxiliary hopper dumping into the primary hopper.

FIG. 5 shows the primary hopper ready to discharge and the auxiliary hoper receiving product.

FIG. 6 shows the primary hopper discharging while the auxiliary hopper receives the product.

DESCRIPTION OF THE PREFERRED EMBODIMENT

In order to distinctly illustrate the invention, only the elements of the combine necessary for an understanding of the invention are illustrated and described in detail.

Referring to FIGS. 1 and 1A, the combine C is of the type for harvesting green peas, green beans, etc., manufactured by the FMC Corporation as a Green Pea Combine. The combine illustrated is not self-propelled but has a draw bar 10 pulled by a tractor, (not shown) in the direction of the arrow at the draw bar. The combine parts are driven by an engine E, and are controlled by controls K, in reach of the tractor operator.

A harvesting or pickup mechanism for the crop is shown generally at 12, the details of which are not critical to the present invention. The vine pick up apparatus may, for example, be like that of the copending application of Slates et al., Ser. No. 538,689, filed Mar. 30, 1966, now Pat. No. 3,408,802. The vines and crop are lifted by an elevator 14 to the thresher portion of the combined.

The thresher portion details of the combine are not critical to the present invention and hence are not illustrated. As an example of the type of thresher which may be employed, reference is made to the patent of Carmichael, Jr. 2,865,378 and to the application of Schultz, Ser. No. 564,129 filed July 11, 1966 and assigned to the assignee of the present invention. These threshers include a rotary drum screen containing beaters which separate the green peas or the like from their pods and drop them onto an apron assembly. The aprons assist further separating the peas from their pods and discharge trash that passed through the drum screen along with the product. The product, e.g. peas, is passed from the aprons to a pea elevator conveyor (not shown) which, in turn transfers the product to a rearwardly running product conveyor belt 16 seen in FIGS. 1 and 1A. It is this belt that carries the product to the hopper assembly of the present invention.

In order to sift out remaining pods "$h$" or the like, a pod separator chain conveyor 18 is provided. This grating moves rearwardly of the machine and serves as a sieve for permitting the product to pass while catching and carrying away hulls, pods, etc. to the rear of the machine. The combine structure described thus far is known in the art and its details are not critical to the present invention, except the structure supplies the product to the hopper system of the invention.

At the product delivery portion or forward end of the combine, framework indicated generally at 20 mounts the hopper units of this invention. These units include a primary or dump hopper P and an auxiliary or interim hopper A. Both hoppers are moved between their respective produce receiving and product discharge positions by a pair of hydraulic cylinders 22. The primary hopper P and its actuating cylinders 22 are known in the prior art per se, because hoppers of this construction were incorporated in the aforesaid earlier models of the FMC green pea combine.

FIG. 1 shows the primary hopper P in its dumping or discharge position, to which it has been moved by the hydraulic cylinders 22, and wherein it is inclined and discharges the harvest product peas "*p*" into a truck T. As indicated by the arrows on both the combine C and the truck T, both vehicles are moving down the field during discharge of the product, it being understood, (as previously mentioned) that a tractor, not shown, is connected to the combine draw bar 10 for moving the combine down the crop row. Of course, the invention is not limited to a tractor operated combine—a self propelled combine can also incorporate the invention.

The essential elements of the primary hopper P will now be described. It comprises an open top, box-like structure 26 (FIG. 2) which is carried in a lower frame 27 having cross bars 27*a*. The end wall 28 of the primary hopper is inclined for insuring rapid emptying of the hopper (FIG. 6). This wall is provided with a door 30, hinged to the wall at 32 and opened and closed by a hydraulic cylinder 34, having valved connections (not shown) to the controls K. The door operating cylinder is connected between a cylinder mounting bracket 36 on the wall 28 of the hopper and a piston rod bracket 38 on the door. Retraction and advance of the cylinder piston opens and closes the door, the details of this structure not being critical to the present invention.

The primary hopper P can assume three critical positions: a retracted or product receiving position (FIG. 4); an intermediate or extended position (FIG. 5); and an advance or dump position (FIG. 6). The mounting elements that provide for these motions will now be described. They include spaced tracks 40, running laterally of the combine and supported on the frame structure 20 (FIG. 1) beneath the delivery end of the product conveyor 16. The hopper itself is mounted in a carriage 42, having side rails 44 (FIGS. 2 and 2A) that extend along the inside of the tracks 40. These side rails are connected by bars 46 which also serve to support the hopper (FIGS. 4 and 5), except when it is in its dumping positions (FIGS. 1 and 6).

In order that the hopper carriage can move freely, the carriage side rails 44 carry rollers 48 which ride in the side rails 40, the latter being of channel section, (FIG. 2A). Stop pieces 50 are welded to the tracks 40 in which the carriage reciprocates in order to keep the carriage from being pushed out of the tracks (FIG. 5) and to initiate the dumping action.

In order to permit the hopper P to pivot for dumping (FIGS. 1 and 6) the discharge end of the hopper is provided with trunnions 52 which pivot in bearings 54 (FIGS. 2 and 2A) formed in the side rails 44 of the carriage. The hydraulic hopper actuating cylinders 22, previously mentioned, are pivotally connected between respective frame and hopper brackets 56, 58. The hopper brackets 58 are mounted on braces 60, 61 projecting upwardly from the hopper framework 27.

The auxiliary hopper A, its connection to and its operation in association with the primary hopper P just described represent features of the present invention. The auxiliary hopper A can be and is substantially smaller than the primary hopper P, because the auxiliary hopper merely receives products during the unloading interim of the primary hopper P. The auxiliary hopper is also in the form of an open box-like structure 62 having an inclined front wall 64 which is angled to facilitate discharge from the auxiliary hopper A into the primary hopper P (FIGS. 2 and 4). In order that the auxiliary hopper can be moved from its discharge position of FIGS. 2 and 4 to its product receiving positions of FIGS. 5 and 6, it is mounted on rollers 66 which ride in L-shaped channel tracks 68 (FIG. 2), having vertical legs 68*a* and generally horizontal legs 68*b*. The vertical legs 68*a* of the L-shaped tracks are supported on uprights 70 projecting upwardly from the frame structure 20 previously described. The generally horizontal legs 68*b* of these tracks are supported by uprights 72 (FIG. 1) which also support the product delivery and products conveyors 16, 18.

The auxiliary hopper is pivotally connected to the carriage 42, for curvelinear motion between the two terminal positions. This connection comprises a pair of generally vertical hopper shifting arms 74 welded at their lower ends to a transverse arm mounting bar 76, which bar is secured to the rear cross bar 46 of the primary hopper carriage 42. The upper ends of the hopper shifting arms 74 are welded to a hinge bar 78, hinged at 80 to hinge brackets 81 projecting forwardly from the top of the auxiliary hopper A.

This connection between the carriage and the auxiliary hopper makes possible the simultaneous motion of both hoppers in their respective positions for discharging and receiving products.

In order to bridge the gap between the auxiliary hopper A and the primary hopper B when the former is discharging into the primary hopper, a self-adjusting apron 82 (FIGS. 3 and 4) is provided. This apron extends transversely across the upper edge of the rear wall 83 of the primary hopper, and is hinged to that wall at 84 (see also FIG. 2). The apron extends rearwardly over the upper edge of the rear wall 83 of the primary hopper and overlies the delivery end of the inclined front wall 64 of the auxiliary hopper, except when the primary hopper is dumping (FIG. 6). It will be noted here that FIG. 2 is an exploded view and the auxiliary hopper A has been moved rearwardly from the apron 82 for clarity of illustration. FIG. 3 shows how the apron 82 overlies the auxiliary hopper A in both positions of the latter, except when the primary hopper P is in its dumping position as shown in FIG. 6.

The apron 82 has a lead-in lip portion 86 which is flush with the inclined front wall of the auxiliary hopper A when the latter is discharging in the primary hopper P, as shown in broken lines in FIG. 3.

OPERATION

In operation, the combine C is pulled down the row crop by the tractor, and in the case of green peas (for example) the vines, pods, etc. are picked up by the pick-up mechanism 12 and raised by the elevator 14 into the drum screen of the thresher (not shown). In the thresher body, the peas are separated from the pods and are lifted up to and deposited on the pea discharge conveyor 16, from which they are dropped onto the separator chain 18. Here, the remaining pods, etc. are caught by the chain, but the peas drop through the chain into the primary hopper P which will normally be in the position of FIG. 4, with the door 30 closed. The auxiliary hopper A will be in its retracted or discharge position as seen in FIG. 4.

When there are enough peas in the primary hopper P to warrant discharge or dumping of that hopper, a truck T or other receiving vehicle will be brought up to the combine C and will be caused to move along with the combine, so that its cargo section is beneath the primary hopper P. The combine operator who, in this case, will be the driver of the tractor (not shown) will now, by means of the controls K energize the primary hopper actuating cylinders 22.

Although the hopper actuating cylinders extend continuously, the action is shown in two steps in FIGS. 5 and 6. FIG. 5 shows an intermediate stage wherein the primary hopper P has advanced to a position such that it has pulled the auxiliary hopper A underneath the discharge conveyor 16. As mentioned, this pulling action is through the primary hopper carriage 42, the vertical arms 74 and the hinge connection 80, as previously described. Because of the presence of the apron 82, during the transition period between the positions of FIGS. 4 and 5, peas will fall either into one hopper or the other and at times into both hoppers, peas falling at the apron 82 rolling into one hopper or the other.

When the hoppers have reached the position of FIG. 5, the front carriage rollers 48 strike the stop pieces 50, thereby arresting further advance of the primary hopper. Continued extension of the pistons of the primary hopper actuating cylinders 22 now tips the primary hopper about its trunnions 52, as seen in FIG. 6. The controls at K are now actuated to hold the primary hopper P in the discharge or dumping position of FIG. 6. The controls for the hydraulic door cylinder 34 are next operated to retract that cylinder and open the hopper door 30, thereby causing the peas $p$ to fall into the truck body. During this interim, the auxiliary hopper A is receiving peas from the pea discharge conveyor 16, as seen in FIG. 6.

When the primary hopper P has been emptied, the door 30 is closed and the actuating cylinders 22 retracted. The first stage of retraction lowers the rear hopper wall 83 and re-establishes engagement of the apron 82 with the forward wall 64 of the auxiliary hopper. Of course peas are continuing to drop into the auxiliary hopper at this time.

Continued retraction of the actuating cylinders 22 moves the primary hopper P (now horizontal) under the discharge conveyor 16 and moves the auxiliary hopper A towards its retracted position. Intermediate the retract stroke, the rollers 66 of the auxiliary hopper ride up onto the vertical legs 68a of the L-shaped track 68 thereby smoothly bringing the auxiliary hopper into its retracted or discharge position, shown in FIG. 4. As the auxiliary hopper is smoothly retracted and inclined towards the vertical, the peas accumulated therein flow into the primary hopper P. The apron 82 bridges the gap between the hoppers as seen in broken lines in FIG. 3, preventing loss of peas in the process.

Thus, in accordance with the present invention, a combine is provided which can be unloaded into a moving vehicle without interrupting motion of the harvester along the field and without loss of product.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, we claim:

1. A combine capable of discharging the harvest product into a vehicle while both traverse a field; said combine comprising a mobile crop pick up and thresher body having a harvest product delivery conveyor, a primary receiver normally positioned for receiving the product from said conveyor, means for moving said primary receiver to a position for discharge into a moving vehicle, an auxiliary receiver for temporarily receiving the product from said conveyor when said primary receiver is discharging, and means for discharging said auxiliary receiver into said primary receiver when the latter returns to its product receiving position.

2. The combine of claim 1, wherein said primary and auxiliary receivers are hoppers, and means for moving said hoppers simultaneously between their respective product receiving and discharge positions.

3. The combine of claim 1, wherein said hoppers move laterally of the combine for side discharge to the vehicle.

4. In a field unloading combine of the type wherein a primary hopper receives the product from a delivery unit of the combine, and with means for moving the primary hopper to a product discharge position; the improvement wherein an auxiliary hopper is provided, said auxiliary hopper having a retracted position wherein it can discharge into the primary hopper when the lattter is in its product receiving position, said auxiliary hopper also having an advanced position for temporarily receiving the product from said combine delivery unit when the primary hopper is in its product discharge position, and means for moving said hoppers between their respective positions.

5. The combine of claim 4, wherein said hopper moving means comprises means connecting said hoppers for simultaneous motion between their respective positions.

6. The combine of claim 5, wherein said auxiliary hopper slides on an L-shaped track, said hopper connecting means being pivotal.

7. The combine of claim 6, wherein said primary hopper is pivotally mounted on a hopper carriage, said carriage running on tracks below said L-shaped tracks, said hopper connecting means being between said primary hopper carriage and said auxiliary hopper.

8. The combine of claim 7, wherein said hopper connecting means projects upwardly from said primary hopper carriage and is pivoted to the delivery end of said auxiliary hopper.

9. The combine of claim 7, wherein said hoppers move laterally of the combine.

10. The combine of claim 5, wherein an apron is mounted on the rear wall of said primary hopper for bridging a gap between said hoppers.

References Cited

UNITED STATES PATENTS 3,408,802  11/1968  Slates et al. _____ 56—364

ROBERT PESHOCK, Primary Examiner

J. A. OLIFF, Assistant Examiner

U.S. Cl. X.R.

56—344; 214—43